United States Patent
McEachen et al.

(10) Patent No.: US 12,115,398 B2
(45) Date of Patent: Oct. 15, 2024

(54) SYSTEM AND METHOD FOR CONTROLLING A FIRE SUPPRESSION SYSTEM OF AN AIRCRAFT

(71) Applicant: The Boeing Company, Chicago, IL (US)

(72) Inventors: George A. McEachen, Chicago, IL (US); Patrick T. Baker, Chicago, IL (US); Rachel M. Darr, Chicago, IL (US); David J. Shaw, Chicago, IL (US)

(73) Assignee: The Boeing Company, Arlington, VA (US)

( * ) Notice: Subject to any disclaimer, the term of this patent is extended or adjusted under 35 U.S.C. 154(b) by 85 days.

(21) Appl. No.: 17/863,555

(22) Filed: Jul. 13, 2022

(65) Prior Publication Data
US 2024/0017105 A1   Jan. 18, 2024

(51) Int. Cl.
*A62C 3/08*     (2006.01)
*A62C 99/00*    (2010.01)
*B64D 45/00*    (2006.01)

(52) U.S. Cl.
CPC ............ *A62C 3/08* (2013.01); *A62C 99/0018* (2013.01); *B64D 2045/009* (2013.01)

(58) Field of Classification Search
CPC ..... A62C 3/08; A62C 99/0018; A62C 35/023; A62C 35/13; A62C 35/68; A62C 37/44; A62C 37/50; A62C 3/07; B64D 2045/009
See application file for complete search history.

(56) References Cited

U.S. PATENT DOCUMENTS

| | | | |
|---|---|---|---|
| 4,469,944 A | 9/1984 | Kern et al. | |
| 4,783,592 A | 11/1988 | Snider et al. | |
| 8,925,642 B2 | 1/2015 | Meier et al. | |
| 8,978,778 B2 * | 3/2015 | Kallergis | A62C 37/44 169/46 |
| 9,182,331 B2 | 11/2015 | Hariram | |
| 9,446,269 B2 | 9/2016 | Shaik et al. | |
| 9,472,079 B2 | 10/2016 | Meier | |
| 9,526,931 B2 * | 12/2016 | Ferguson | A62C 37/36 |
| 2012/0217028 A1 * | 8/2012 | Chattaway | A62C 99/0018 169/62 |
| 2015/0034342 A1 * | 2/2015 | Seebaluck | A62C 3/08 169/61 |

(Continued)

FOREIGN PATENT DOCUMENTS

| | | |
|---|---|---|
| EP | 2399649 B1 | 9/2015 |
| GB | 2126713 B | 11/1984 |

OTHER PUBLICATIONS

Extended European Search Report prepared by the European Patent Office in application No. EP 23 18 1676 dated Dec. 8, 2023.

*Primary Examiner* — Christopher R Dandridge
(74) *Attorney, Agent, or Firm* — McDonnell Boehnen Hulbert & Berghoff LLP (57) ABSTRACT

A method implemented on an aircraft for controlling a fire suppression system comprises receiving, by a computing system of the aircraft, an indication that the fire suppression system of the aircraft should transition to an active state. The computing system determines whether the aircraft is on a surface. Responsive to determining that the aircraft is on the surface, the computing system controls the fire suppression system to remain or transition to an inactive state.

20 Claims, 5 Drawing Sheets

(56) References Cited

U.S. PATENT DOCUMENTS

| | | | |
|---|---|---|---|
| 2015/0336681 A1* | 11/2015 | Kern | F01D 17/085 340/945 |
| 2017/0014655 A1 | 1/2017 | Gatsonides et al. | |
| 2019/0160317 A1 | 5/2019 | Kallergis et al. | |
| 2020/0094089 A1* | 3/2020 | Hagge | A62C 5/00 |

* cited by examiner

SYSTEM AND METHOD FOR CONTROLLING A FIRE SUPPRESSION SYSTEM OF AN AIRCRAFT

BACKGROUND

Field

This application generally relates to aircraft safety systems. In particular, this application relates to a system and method for controlling a fire suppression system of an aircraft.

Description of Related Art

Modern passenger transport aircraft typically include a fire suppression system in the cargo hold of the aircraft. Generally, when smoke or fire is detected within the cargo hold, the fire suppression system is configured to flood the cargo hold with an inert gas. The inert gas displaces oxygen, which in turn extinguishes any fire.

The inert gas Halon 1301 has been used in fire suppression systems since the 1970s. Halon 1301 is effective at extinguishing fires at concentrations of about 5%. At this concentration, Halon 1301 has a relatively low toxicity level to humans. Thus, inadvertent releases of Halon 1301 into the cargo hold while personnel are present in the cargo hold do not generally pose any serious threat to the health and safety of these personnel.

Unfortunately, Halon 1301 is internationally recognized as a very potent ozone-depleting compound when it collects in the upper stratosphere. Production of Halon 1301 was therefore banned under the Montreal Protocol. Alternative inert gases that can extinguish fires and that do not negatively impact the environment do exist. However, the concentrations at which these inert gases become effective tend to be toxic to humans.

SUMMARY

In a first aspect, a method implemented on an aircraft for controlling a fire suppression system comprises receiving, by a computing system of the aircraft, an indication that the fire suppression system of the aircraft should transition to an active state. The computing system determines whether the aircraft is on a surface. Responsive to determining that the aircraft is on the surface, the computing system controls the fire suppression system to remain or transition to an inactive state.

In a second aspect, an aircraft comprises a fire suppression system and a computing system that controls the activation of the fire suppression system. The computing system comprises one or more instruction storage devices for storing instruction code and one or more processors in communication with the one or more instruction storage devices. Execution of the instruction code by the one or more processors causes the computing system to perform operations comprising receiving, by a computing system of the aircraft, an indication that the fire suppression system of the aircraft should transition to an active state. The computing system determines whether the aircraft is on a surface. Responsive to determining that the aircraft is on the surface, the computing system controls the fire suppression system to remain or transition to an inactive state.

In a third aspect, a non-transitory computer-readable medium stores instruction code that facilitates controlling a fire suppression system of an aircraft. Execution of the instruction code by one or more processors of a computing system causes the computing system to perform operations comprising receiving, by a computing system of the aircraft, an indication that the fire suppression system of the aircraft should transition to an active state. The computing system determines whether the aircraft is on a surface. Responsive to determining that the aircraft is on the surface, the computing system controls the fire suppression system to remain or transition to an inactive state.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

The figures are schematic, not necessarily to scale, and generally only show aspects that are necessary to elucidate example embodiments, wherein other aspects may be omitted or merely suggested.

DETAILED DESCRIPTION

Numerous examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

INTRODUCTION

As noted above, the production of Halon 1301 was banned by the Montreal Protocol because it is a very potent ozone-depleting compound when it collects in the upper stratosphere. Alternative inert gases that can extinguish fires and that do not negatively impact the environment do exist. However, the concentrations at which these inert gases become effective tend to be toxic to humans.

These and other issues are ameliorated by various systems and methods for controlling a fire suppression system of an aircraft. For instance, an example of an aircraft comprises a fire suppression system and a computing system that controls the activation of the fire suppression system. The computing system is configured to receive an indication that the fire suppression system of the aircraft should transition to an active state. For example, the computing system receives an indication of smoke or fire in the cargo hold of the aircraft. Subsequently, the computing system determines whether the aircraft is on the ground. For example, the computing system evaluates various sensors of the aircraft to determine whether the aircraft is on the ground. Responsive to determining that the aircraft is on the ground, the computing system controls the fire suppression system to remain or transition to an inactive state. If, on the other hand, the computing system determines that the aircraft is not on the ground, the computing system controls the fire suppression system to enter or transition to the active state to suppress any fire.

Some examples of the sensors facilitate determining whether there is weight on the wheels of the aircraft. Some examples of the sensors facilitate determining whether one or more cargo doors of the aircraft are open. Some examples of the sensors facilitate determining whether one or more engines of the aircraft are running. Information from these sensors facilitates determining whether the aircraft is likely on the ground.

Some examples of the aircraft comprise a bypass pin that allows service personnel to manually disable the fire suppression system. Service personnel remove the bypass pin after all service personnel leave the cargo hold and the cargo hold door is closed.

Figures 1A, 1B, 1C:
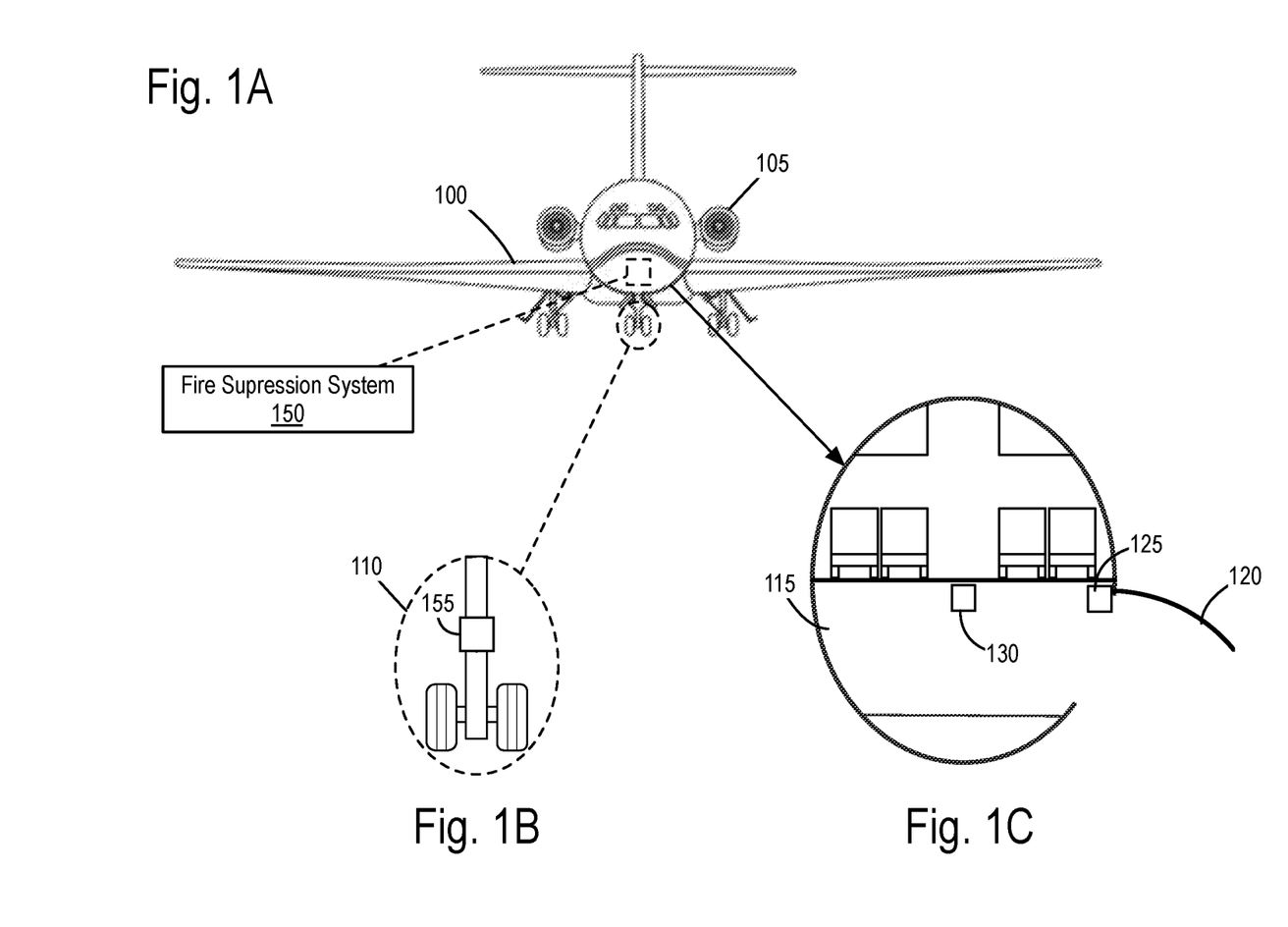
FIG. 1A illustrates an aircraft, in accordance with example embodiments.
FIG. 1B illustrates the landing gear of the aircraft, in accordance with example embodiments.
FIG. 1C illustrates a cargo hold of the aircraft, in accordance with example embodiments.

FIGS. 1A-1C illustrate various aspects of an example of an aircraft 100. As shown, the aircraft 100 includes one or more engines 105, landing gear 110, a cargo hold 115, and a fire suppression system 150.

Some examples of the landing gear 110 comprise a weight-on-wheel sensor 155 (WOW sensor). The WOW sensor 155 is configured to sense an amount of weight on the landing gear of the aircraft. Some examples of the aircraft 100 include a WOW sensor 155 for each wheelset.

Some examples of the WOW sensor 155 comprise a strain gauge that is configured to be attached to, for example, a landing gear strut. A slight deformation in the strut due to stress (e.g., weight) on the struct causes the electrical resistance of the strain gauge to change, which can be sensed (e.g., by providing a voltage across the strain gauge and measuring current flow through the strain gauge). In some examples, a value indicative of the sensed strain is communicated to the fire suppression system 150. In some examples, when this value exceeds a threshold value indicative of a threshold weight on the landing gear, the fire suppression system 150 determines the aircraft 100 to be on the ground.

The cargo hold 115 comprises a cargo door 120 that facilitates access to the cargo hold 115. In some examples, a cargo door position sensor 125 is configured to sense whether the cargo door 120 is open. An example of the cargo door position sensor 125 corresponds to a mechanical switch that is actuated (e.g., electrically closed) when the cargo door 120 is closed. This example of the cargo door position sensor 125 may output a binary indication of the state of the cargo door 120 (e.g., open or closed). Another example of the cargo door position sensor 125 is configured to output more than two states (e.g., closed, opened, partially open, fully open, etc.) In some examples, the state of the cargo door position sensor 125 is communicated to the fire suppression system 150.

Some examples of the cargo hold 115 comprise one or more output ports 130 through which a fire suppression agent (e.g., an inert gas such a nitrogen, argon, and carbon dioxide or a green agent including a combination of inert gases) is dispersed. Other fire suppression agents can be used as well including hydrofluorocabron (HFC). Details of this operation are described in further detail below.

In some examples, an indication of whether one or more of the engines 105 is operating is communicated to the fire suppression system 150. For instance, in some examples, an engine run signal is communicated to the fire suppression system 150. An example of the engine run signal indicates the state of one or more of the engines 105 (e.g., on or off). In some examples, an engine speed sensor that outputs an indication of the turbine speed of one or more of the engines 105 may be communicated directly or indirectly (e.g., via another system) to the fire suppression system 150.

The various indications provided by the sensors above facilitate determining whether the aircraft 100 is on the ground. For example, the aircraft 100 is likely to be on the ground when the cargo door 120 is open, the engines 105 are not running, or when there is weight sensed on the landing gear 110.

Figure 2:
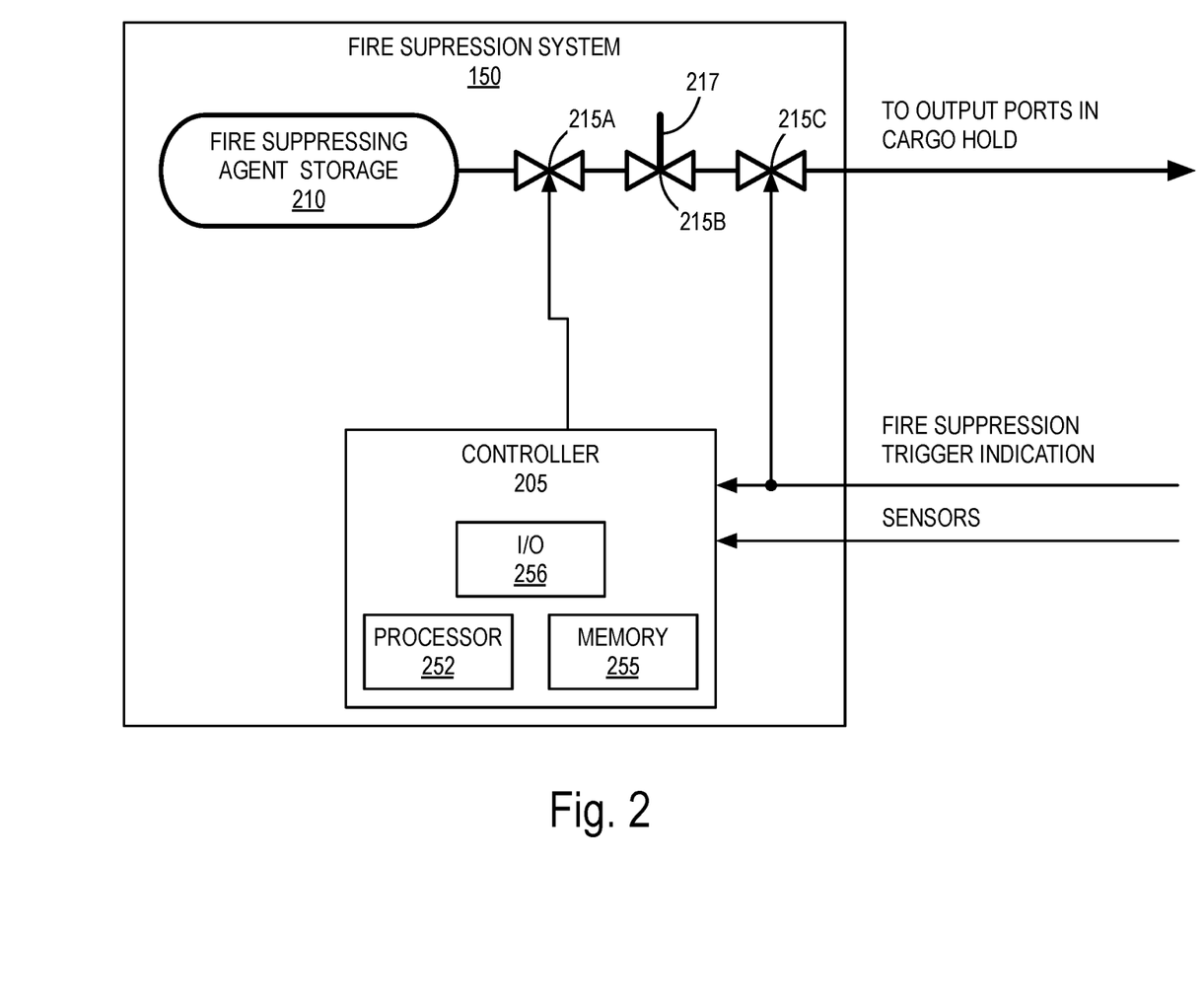
FIG. 2 illustrates a fire suppression system of the aircraft, in accordance with example embodiments.

FIG. 2 illustrates an example of a fire suppression system 150. Some examples of the fire suppression system 150 comprise a controller 205, a fire suppressing agent (FSA) storage tank 210, and one or more valves 215A, 215B, 215C.

An example of the FSA storage tank 210 is configured to hold a fire suppressing agent such as an inert gas. In some examples, the fire suppressing agent is held in the FSA storage tank 210 under pressure. In some examples, the output of the FSA storage tank 210 is fluidly coupled (e.g., via one or more conduits) to one or more output ports 130 in the cargo hold via the one or more valves 215A, 215B, 215C.

Three valves 215A, 215B, 215C are illustrated in the FIG. 2, but the number of valves may be different. The valves 215A, 215B, 215C are illustrated as being coupled in series. Thus, in some examples, all three valves 215A, 215B, 215C are required to be open for the fire suppressing agent to flow. Closing any one of the three valves 215A, 215B, 215C inhibits the flow of the fire suppressing agent.

Some examples of the valves correspond to electrically or mechanically actuated valves. For example, a first valve 215A is configured to receive an electrical signal from the controller 205 that causes the first valve 215A to either open or close. In some examples, the first valve 215A is a normally open valve. For instance, the first valve 215A may comprise a resilient member that urges the first valve 215A into the open state. Thus, if the controller 205 were to become unresponsive (e.g., not communicating the aforementioned signal), the first valve 215A would default to an open state.

A second valve 215B is mechanically or electrically coupled to, for example, a bypass pin 217. An example of the bypass pin 217 is inserted into a receiving slot on, for example, the underside of the fuselage. The bypass pin 217 is designed to be highly visible (e.g., a large, brightly colored object displaying a prominent warning). In operation, an operator on the ground inserts the bypass pin 217 into the receiving slot. This, in turn, causes the second valve 215B to close, thus preventing the flow of the fire suppressing agent. Before departure, the operator removes the bypass pin 217, which causes the second valve 215B to open. In some examples, the bypass pin 217 mechanically engages and closes the second valve 215B. In some examples, the bypass pin 217 engages an electrical switch that communicates directly or indirectly (e.g., via the controller 205) a signal that closes the second valve 215B. In this regard, in some examples, the first and second valves 215A, 215B can be replaced by a single valve and the signal associated with the insertion or removal of the bypass pin 217 can be communicated to the controller 205, which can responsively open or close the valve. In some examples, an indicator is communicated to the cockpit to alert the pilot as to whether the bypass pin 217 is inserted.

A third valve 215C is configured to be actuated in response to a first suppression trigger signal. For instance, an example of the first suppression trigger signal is communicated from a smoke or fire detector positioned within the cargo hold 115. In some examples, the first, second, and third valves 215A, 215B, 215C can be replaced by a single valve and the signal associated with the insertion or removal of the bypass pin 217 and the trigger signal can be communicated to the controller 205, which can responsively open or close the valve.

Some examples of the controller 205 comprise a memory 244, a processor 242, and an input/output (I/O) subsystem 246. The processor 242 is in communication with the memory 244. The processor 242 is configured to execute instruction code stored in the memory 244. The instruction code facilitates performing, by the controller 205, various operations that are described below. In this regard, the instruction code may cause the processor 242 to control and coordinate various activities performed by the different subsystems of the controller 205. Some examples of the processor 242 correspond to an ARM®, Intel®, AMD®, PowerPC®, etc., based processor. Some examples of the processor are configured to execute an operating system, such as Windows®, Linux®, Unix®, or a different operating system.

Some examples of the I/O subsystem 246 include one or more input/output interfaces configured to facilitate communications with entities outside of the controller 205. For instance, some examples of the I/O subsystem 246 are configured to receive signals from the various sensors described above and to communicate the signals to one or more of the valves 215A, 215B, 215C to open or close the valves 215A, 215B, 215C.

Figure 3:
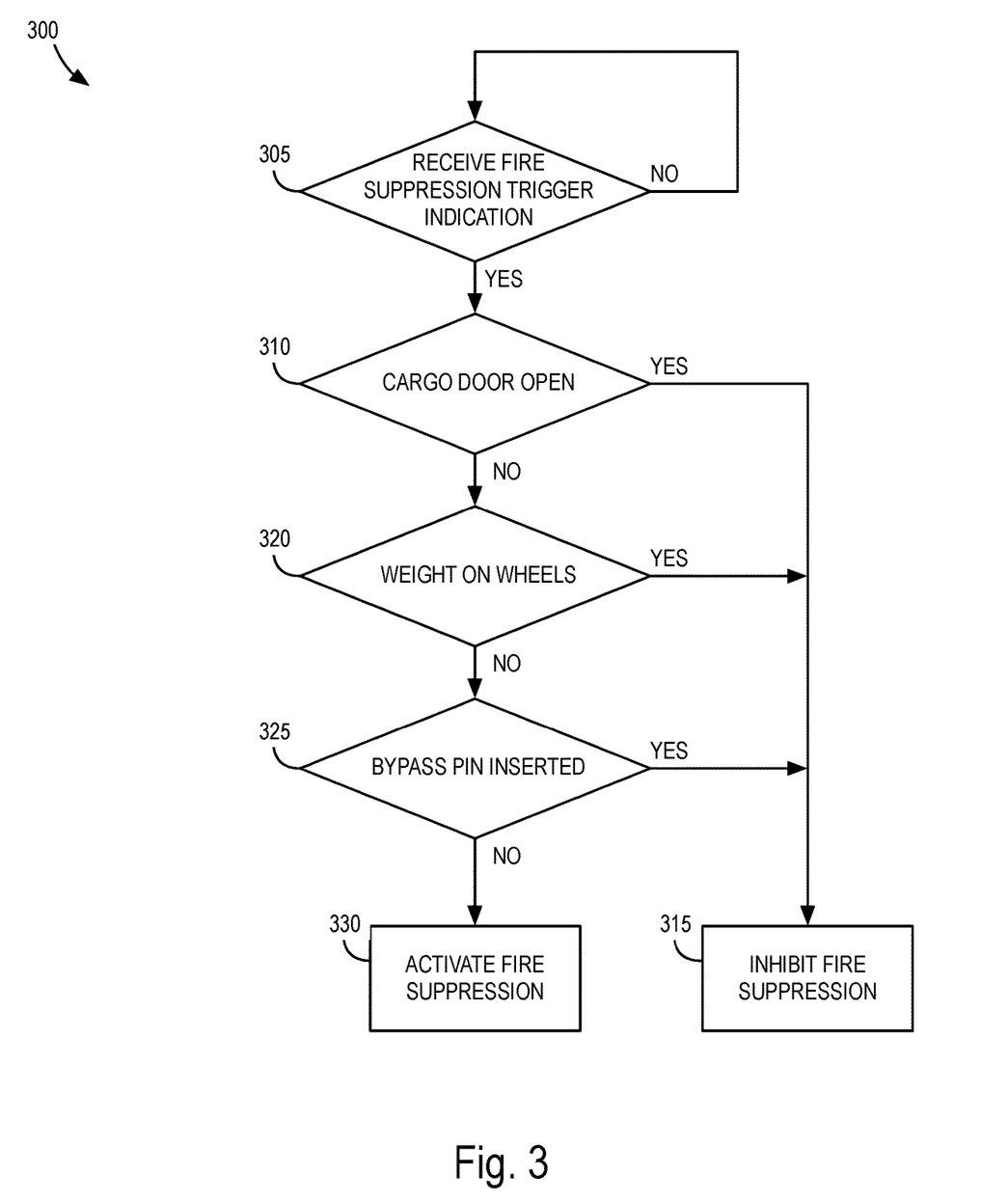
FIG. 3 illustrates operations that facilitate controlling a fire suppression system of an aircraft, in accordance with example embodiments.

FIG. 3 illustrates examples of operations 300 that facilitate controlling a fire suppression system 150. These operations are performed by some examples of the devices described above (e.g., the controller 205). In some examples, one or more of these operations are implemented via instruction code, stored in corresponding data storage (e.g., memory 244) of these devices. Execution of the instruction code by corresponding processors of the devices causes these devices to perform these operations 300 alone or in combination with other devices.

The operations at block 305 involve determining whether a fire suppression trigger indication has been received. For instance, in some examples, a fire suppression trigger indication is received by the controller 205 and from a smoke detector in the cargo hold 115 when smoke or fire is detected in the cargo hold 115. In this regard, in some examples, the cargo hold 115 comprises numerous smoke and/or fire sensors. The outputs of the smoke and/or fire sensors may be communicated to the controller 205. In some examples, the controller 205 is configured to facilitate the communication of the fire suppressing agent to an output port that is positioned within a section of the cargo hold 115 in which smoke and/or fire is detected.

The operations at block 310 involve determining whether the cargo door 120 is open. For instance, an example of the controller 205 receives a signal from a cargo door position sensor 125 indicative of whether the cargo door 120 is open. As noted above, an example of the cargo door position sensor 125 corresponds to a mechanical switch that is actuated (e.g., electrically closed) when the cargo door 120 is closed. This example of the cargo door position sensor 125 may output a binary indication of the state of the cargo door 120 (e.g., open or closed). Another example of the cargo door position sensor 125 is configured to output more than two states (e.g., closed, opened, partially open, fully open, etc.)

If at block 310, the cargo door 120 is determined to be open, then the operations at block 315 are performed. The operations at block 315 involve inhibiting the fire suppression system 150 from operating. For instance, in some examples, the controller 205 communicates a signal to the first valve 215A that causes the first valve 215A to open and therefore prevents the flow of fire suppressing agent to the outlet port in the cargo hold 115.

If at block 310, the cargo door 120 is determined to be closed, then the operations at block 320 are performed. The operations at block 320 involve determining whether there is weight on the wheels (e.g., the landing gear) of the aircraft 100. For instance, an example of the controller 205 receives a signal from the WOW sensor 155. As noted above, the WOW sensor 155 comprises a strain gauge that is configured to be attached to, for example, a landing gear strut. A slight deformation in the strut due to stress on the struct causes the electrical resistance of the strain gauge to change, which can be sensed (e.g., by providing a voltage across the strain gauge and measuring current flow through the strain gauge. The amount of current measured is generally proportional to the weight on the landing gear 110.

If, at block 320, weight is determined to be present on the landing gear 110 and that weight exceeds a threshold weight, then the operations at block 315 are performed (i.e., the fire suppression system 150 is inhibited from operating.

If, at block 320, weight is not determined to be present on the wheels or the weight does not exceed the threshold weight, then the operations at block 325 are performed. The operations at block 325 involve determining whether a bypass pin 217 is inserted. As noted above, some examples of the bypass pin 217, when inserted, mechanically engage and close a valve (e.g., the second valve 215) that prevents the flow of the fire suppressing agent to the outlet port in the cargo hold 115. In some examples, the bypass pin 217 engages an electrical switch that communicates directly or indirectly (e.g., via the controller 205) a signal that opens the second valve 215B.

If at block 325, the bypass pin 217 is determined to be inserted, then the operations at block 315 are performed (i.e., the fire suppression system 150 is inhibited from operating.

If at block 325, the bypass pin 217 is determined to not be inserted, then the operations at block 330 are performed. The operations at block 330 involve activating the fire suppression system 150. For instance, if none of the conditions evaluated above are determined to be true, then the valve or valves that couple the FSA storage tank 210 to the outlet port in the cargo hold 115 are opened to allow the fire suppressing agent to flow into the cargo hold 115.

Figure 4:
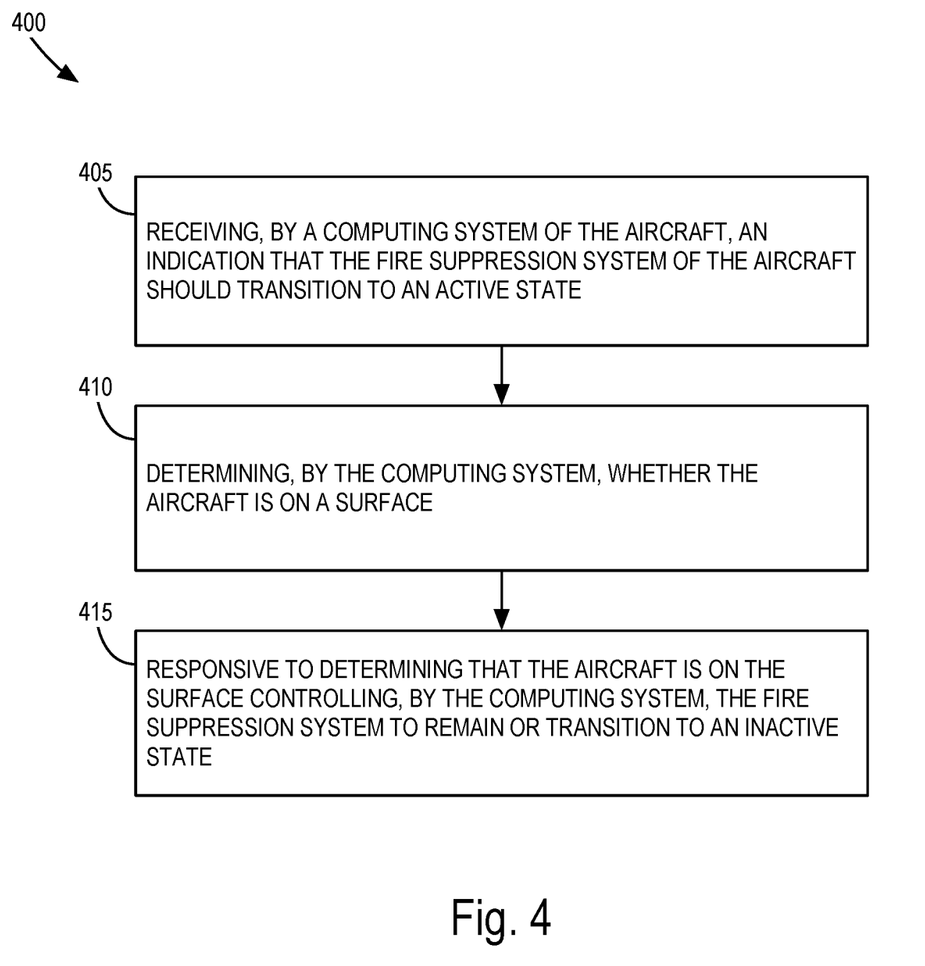
FIG. 4 illustrates operations that facilitate controlling a fire suppression system of an aircraft, in accordance with example embodiments.

FIG. 4 illustrates operations 400 that facilitate controlling a fire suppression system 150 of an aircraft. These operations are best understood with reference to the figures described above.

The operations at block 405 involve receiving, by a computing system of the aircraft 100, an indication that the fire suppression system 150 of the aircraft 100 should transition to an active state. In one example, the computing system is the controller 205.

The operations at block 410 involve, responsive to determining that the aircraft 100 is on the surface, controlling, by the computing system, the fire suppression system 150 to remain or transition to an inactive state.

Some examples of the operations involve, responsive to determining that the aircraft 100 is not on the surface, controlling, by the computing system, the fire suppression system 150 to enter the active state.

In some examples, determining whether the aircraft 100 is on the surface further involves determining, by the computing system, that the aircraft 100 is on the surface when a landing gear weight-on-wheel (WOW) sensor 155 in communication with the computing system indicates a weight that exceeds a threshold weight.

In some examples, determining whether the aircraft 100 is on the surface further involves determining, by the computing system, that the aircraft 100 is on the surface when a cargo door position sensor 125 in communication with the computing system senses that a cargo door 120 is open.

In some examples, determining whether the aircraft 100 is on the surface further involves determining, by the computing system, that the aircraft 100 is on the surface when an engine run signal in communication with the computing system indicates that one or more engines 105 of the aircraft 100 are inactive.

In some examples, receiving the indication that the fire suppression system 150 should be activated further involves receiving, by the computing system and from a fire detection sensor located in a cargo hold 115 of the aircraft 100, an indication of smoke in the cargo hold 115 of the aircraft 100.

In some examples, receiving the indication that the fire suppression system 150 should be activated on the aircraft 100 further involves receiving, by the computing system of the aircraft 100, an indication that an inert gas-based fire suppression system 150 should be transitioned to an active state.

In some examples, the fire suppression system 150 is configured to receive a bypass pin 217. These examples further involve controlling the fire suppression system 150 to remain or transition to the inactive state when the bypass pin 217 is inserted.

Figure 5:
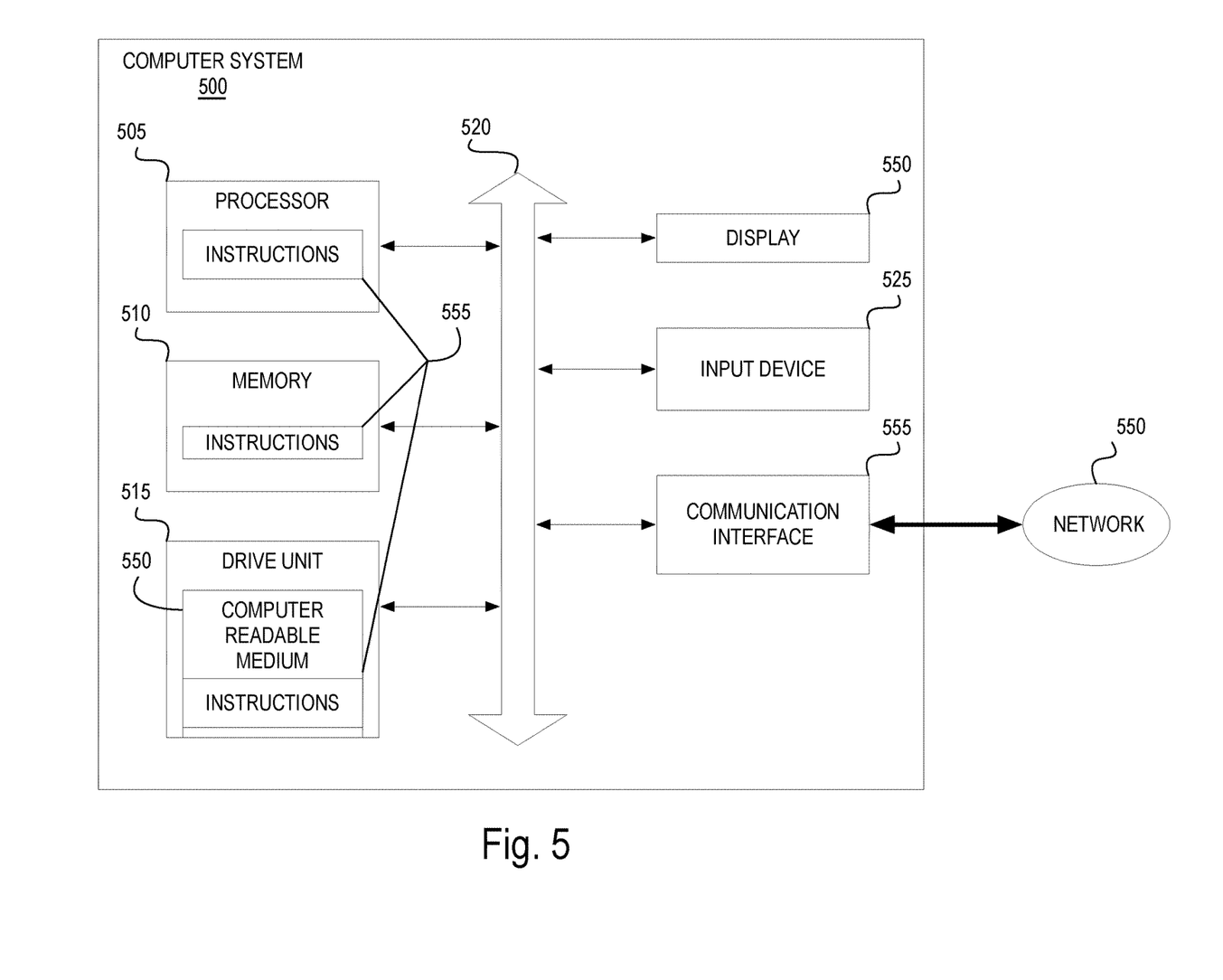
FIG. 5 illustrates an example of a computer system that can form part of or implement any of the systems and/or devices described herein, in accordance with example embodiments.

FIG. 5 illustrates an example of a computer system 500 that can form part of or implement any of the systems and/or devices described above. Some examples of the computer system 500 include a set of instructions 545 that the processor 505 can execute to cause the computer system 500 to perform any of the operations described above. Some examples of the computer system 500 operate as a standalone device or can be connected, e.g., using a network, to other computer systems or peripheral devices.

In a networked example, some examples of the computer system 500 operate in the capacity of a server or as a client computer in a server-client network environment, or as a peer computer system in a peer-to-peer (or distributed) environment. Some examples of the computer system 500 are implemented as or incorporated into various devices, such as a personal computer or a mobile device, capable of executing instructions 545 (sequential or otherwise), causing a device to perform one or more actions. Further, some examples of the systems described include a collection of subsystems that individually or jointly execute a set, or multiple sets, of instructions to perform one or more computer operations.

Some examples of the computer system 500 include one or more memory devices 510 communicatively coupled to a bus 520 for communicating information. In addition, in some examples, code operable to cause the computer system to perform operations described above is stored in the memory 510. Some examples of the memory 510 are random-access memory, read-only memory, programmable memory, hard disk drive, or any other type of memory or storage device.

Some examples of the computer system 500 include a display 530, such as a liquid crystal display (LCD), organic light-emitting diode (OLED) display, or any other display suitable for conveying information. Some examples of the display 530 act as an interface for the user to see processing results produced by processor 505.

Additionally, some examples of the computer system 500 include an input device 525, such as a keyboard or mouse or touchscreen, configured to allow a user to interact with components of system 500.

Some examples of the computer system 500 include a drive unit 515 (e.g., flash storage). Some examples of the drive unit 515 include a computer-readable medium 540 in which the instructions 545 can be stored. Some examples of the instructions 545 reside completely, or at least partially, within the memory 510 and/or within the processor 505 during execution by the computer system 500. Some examples of the memory 510 and the processor 505 include computer-readable media, as discussed above.

Some examples of the computer system 500 include a communication interface 535 to support communications via a network 550. Some examples of the network 550 include wired networks, wireless networks, or combinations thereof. Some examples of the communication interface 535 facilitate communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, some examples of the methods and systems described herein are realized in hardware, software, or a combination of hardware and software. Some examples of the methods and systems are realized in a centralized fashion in at least one computer system or in a distributed fashion where different elements are spread across interconnected computer systems. Any kind of computer system or other apparatus adapted for carrying out the methods described herein can be employed.

Some examples of the methods and systems described herein are embedded in a computer program product, which includes all the features that facilitate the implementation of the operations described herein and which, when loaded in a computer system, cause the computer system to perform these operations. A computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made, and equivalents can be substituted without departing from the scope of the claims. Therefore, it is intended that the present methods and systems are not limited to the examples disclosed but that the disclosed methods and systems include all embodiments falling within the scope of the appended claims.

What is claimed is:

1. A method implemented on an aircraft for controlling a fire suppression system, the method comprising:
   receiving, by a computing system of the aircraft, an indication that the fire suppression system of the aircraft should transition to an active state;
   determining, by the computing system, whether the aircraft is on a surface; and
   responsive to determining that the aircraft is on the surface controlling, by the computing system, the fire suppression system to remain or transition to an inactive state,
   wherein the fire suppression system comprises a fire suppressing agent storage tank, configured to hold a fire suppressing agent, that is fluidly coupled to an output port via multiple valves connected in series where closing any of the multiple valves inhibits flow of the fire suppressing agent to the output port,
   wherein a first valve of the multiple valves is configured to receive an electrical signal from the computing system that causes the first valve to be actuated and responsive to determining that the aircraft is on the surface controlling, by the computing system, the first valve to remain or transition to a closed state resulting in the fire suppression system being in the inactive state,
   wherein a second valve of the multiple valves is configured to receive a bypass pin that causes the second valve to close such that the fire suppression system remains or transitions to the inactive state when the bypass pin is inserted, and
   wherein a third valve of the multiple valves is configured to be actuated in response to receiving a trigger signal from a fire detection sensor that causes the third valve to open.

2. The method according to claim 1, further comprising:
   responsive to determining that the aircraft is not on the surface, controlling, by the computing system, the fire suppression system to enter the active state.

3. The method according to claim 1, wherein determining whether the aircraft is on the surface comprises:
   determining, by the computing system, that the aircraft is on the surface when a landing gear weight-on-wheel (WOW) sensor in communication with the computing system indicates a weight that exceeds a threshold weight.

4. The method according to claim 1, wherein determining whether the aircraft is on the surface comprises:
   determining, by the computing system, that the aircraft is on the surface when a cargo door position sensor in communication with the computing system senses that a cargo door is open.

5. The method according to claim 1, wherein determining whether the aircraft is on the surface comprises:
   determining, by the computing system, that the aircraft is on the surface when an engine run signal in communication with the computing system indicates that one or more engines of the aircraft are inactive.

6. The method according to claim 1, wherein receiving the indication that the fire suppression system should be activated comprises:
   receiving, by the computing system and from the fire detection sensor located in a cargo hold of the aircraft, an indication of smoke in the cargo hold of the aircraft.

7. The method according to claim 1, wherein receiving the indication that the fire suppression system should be activated on the aircraft further comprises:
   receiving, by the computing system of the aircraft, an indication that an inert gas-based fire suppression system should be transitioned to an active state.

8. An aircraft that comprises:
   a fire suppression system, wherein the fire suppression system comprises a fire suppressing agent storage tank, configured to hold a fire suppressing agent, that is fluidly coupled to an output port via multiple valves connected in series where closing any of the multiple valves inhibits flow of the fire suppressing agent to the output port; and
   a computing system that controls activation of the fire suppression system, wherein the computing system comprises:
      one or more instruction storage devices for storing instruction code; and
      one or more processors in communication with the one or more instruction storage devices, wherein execution of the instruction code by the one or more processors causes the computing system to perform operations comprising:
         receiving, by the computing system, an indication that the fire suppression system of the aircraft should transition to an active state;
         determining, by the computing system, whether the aircraft is on a surface; and
         responsive to determining that the aircraft is on the surface controlling, by the computing system, the fire suppression system to remain or transition to an inactive state,
      wherein a first valve of the multiple valves is configured to receive an electrical signal from the computing system that causes the first valve to be actuated and responsive to determining that the aircraft is on the surface controlling, by the computing system, the first valve to remain or transition to a closed state resulting in the fire suppression system being in the inactive state,
      wherein a second valve of the multiple valves is configured to receive a bypass pin that causes the second valve to close such that the fire suppression system remains or transitions to the inactive state when the bypass pin is inserted, and wherein a third valve of the multiple valves is configured to be actuated in response to receiving a trigger signal from a fire detection sensor that causes the third valve to open.

9. The aircraft according to claim 8, further comprising:
responsive to determining that the aircraft is not on the surface, controlling, by the computing system, the fire suppression system to enter the active state.

10. The aircraft according to claim 8, wherein determining whether the aircraft is on the surface comprises:
determining, by the computing system, that the aircraft is on the surface when a landing gear weight-on-wheel (WOW) sensor in communication with the computing system indicates a weight that exceeds a threshold weight.

11. The aircraft according to claim 8, wherein determining whether the aircraft is on the surface comprises:
determining, by the computing system, that the aircraft is on the surface when a cargo door position sensor in communication with the computing system senses that a cargo door is open.

12. The aircraft according to claim 8, wherein determining whether the aircraft is on the surface comprises:
determining, by the computing system, that the aircraft is on the surface when an engine run signal in communication with the computing system indicates that one or more engines of the aircraft are inactive.

13. The aircraft according to claim 8, wherein receiving the indication that the fire suppression system should be activated comprises:
receiving, by the computing system and from the fire detection sensor located in a cargo hold of the aircraft, an indication of smoke in the cargo hold of the aircraft.

14. The aircraft according to claim 8, wherein receiving the indication that the fire suppression system should be activated on the aircraft further comprises:
receiving, by the computing system of the aircraft, an indication that an inert gas-based fire suppression system should be transitioned to an active state.

15. A fire suppression system comprising:
a fire suppressing agent storage tank, configured to hold a fire suppressing agent, that is fluidly coupled to an output port via multiple valves connected in series where closing any of the multiple valves inhibits flow of the fire suppressing agent to the output port; and
a computing system that controls activation of the fire suppression system, wherein the computing system comprises:
one or more instruction storage devices for storing instruction code; and
one or more processors in communication with the one or more instruction storage devices, wherein execution of the instruction code by the one or more processors causes the computing system to perform operations comprising:
receiving, by the computing system, an indication that the fire suppression system of the aircraft should transition to an active state;
determining, by the computing system, whether the aircraft is on a surface; and
responsive to determining that the aircraft is on the surface controlling, by the computing system, the fire suppression system to remain or transition to an inactive state, wherein a first valve of the multiple valves is configured to receive an electrical signal from the computing system that causes the first valve to be actuated and responsive to determining that the aircraft is on the surface controlling, by the computing system, the first valve to remain or transition to a closed state resulting in the fire suppression system being in the inactive state, wherein a second valve of the multiple valves is configured to receive a bypass pin that causes the second valve to close such that the fire suppression system remains or transitions to the inactive state when the bypass pin is inserted, and wherein a third valve of the multiple valves is configured to be actuated in response to receiving a trigger signal from a fire detection sensor that causes the third valve to open.

16. The fire suppression system of claim 15, wherein determining whether the aircraft is on the surface comprises:
determining, by the computing system, that the aircraft is on the surface when an engine run signal in communication with the computing system indicates that one or more engines of the aircraft are inactive.

17. The fire suppression system of claim 15, wherein receiving the indication that the fire suppression system should be activated comprises:
receiving, by the computing system and from the fire detection sensor located in a cargo hold of the aircraft, an indication of smoke in the cargo hold of the aircraft.

18. The fire suppression system of claim 15, wherein receiving the indication that the fire suppression system should be activated on the aircraft further comprises:
receiving, by the computing system of the aircraft, an indication that an inert gas-based fire suppression system should be transitioned to an active state.

19. The method according to claim 1,
wherein determining, by the computing system, whether the aircraft is on the surface comprises determining, by the computing system:
that a cargo door position sensor in communication with the computing system senses that a cargo door is open; and
that a landing gear weight-on-wheel (WOW) sensor in communication with the computing system indicates a weight that exceeds a threshold weight.

20. The aircraft according to claim 8,
wherein determining, by the computing system, whether the aircraft is on the surface comprises determining, by the computing system:
that a cargo door position sensor in communication with the computing system senses that a cargo door is open; and
that a landing gear weight-on-wheel (WOW) sensor in communication with the computing system indicates a weight that exceeds a threshold weight.

* * * * *